(12) United States Patent
Marcjan (10) Patent No.: US 7,346,925 B2
(45) Date of Patent: Mar. 18, 2008

(54) FIREWALL TUNNELING AND SECURITY SERVICE

(75) Inventor: Cezary Marcjan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 839 days.

(21) Appl. No.: 10/733,219

(22) Filed: Dec. 11, 2003

(65) Prior Publication Data

US 2005/0132221 A1 Jun. 16, 2005

(51) Int. Cl.
*G06F 9/00* (2006.01)
(52) U.S. Cl. ........................................ 726/12
(58) Field of Classification Search .................. 726/4, 726/12
See application file for complete search history.

(56) References Cited

U.S. PATENT DOCUMENTS

| | | | |
|---|---|---|---|
| 5,784,463 A * | 7/1998 | Chen et al. .................. 713/171 |
| 6,006,018 A | 12/1999 | Burnett et al. | |
| 6,061,796 A * | 5/2000 | Chen et al. .................. 726/15 |
| 6,104,716 A | 8/2000 | Crichton et al. | |
| 6,151,675 A * | 11/2000 | Smith .......................... 713/153 |
| 6,158,011 A * | 12/2000 | Chen et al. .................. 726/15 |
| 6,349,336 B1 * | 2/2002 | Sit et al. ..................... 709/227 |
| 6,636,854 B2 | 10/2003 | Dutta et al. | |
| 6,754,831 B2 * | 6/2004 | Brownell ..................... 726/15 |
| 7,043,644 B2 * | 5/2006 | DeBruine .................... 713/153 |
| 7,047,406 B2 * | 5/2006 | Schleicher et al. ......... 713/168 |
| 7,139,798 B2 * | 11/2006 | Zircher et al. .............. 709/204 |
| 7,150,040 B2 * | 12/2006 | Brownell ..................... 726/11 |
| 7,251,824 B2 * | 7/2007 | Edwards et al. ............. 726/4 |
| 2002/0010866 A1 * | 1/2002 | McCullough et al. ....... 713/201 |
| 2002/0103998 A1 * | 8/2002 | DeBruine ..................... 713/153 |
| 2002/0138291 A1 * | 9/2002 | Vaidyanathan et al. ......... 705/1 |
| 2002/0138362 A1 * | 9/2002 | Kitze et al. ..................... 705/26 |
| 2002/0138440 A1 * | 9/2002 | Vaidyanathan et al. ....... 705/54 |
| 2002/0138576 A1 * | 9/2002 | Schleicher et al. .......... 709/205 |
| 2002/0138744 A1 * | 9/2002 | Schleicher et al. .......... 713/187 |
| 2002/0143944 A1 * | 10/2002 | Traversat et al. ........... 709/225 |
| 2002/0162026 A1 * | 10/2002 | Neuman et al. ............. 713/201 |
| 2003/0009518 A1 * | 1/2003 | Harrow et al. .............. 709/203 |
| 2003/0009586 A1 * | 1/2003 | Harrow et al. .............. 709/238 |

(Continued)

OTHER PUBLICATIONS

Eli Herscovitz. Sercure Virtual Private Networks: the Future of Data Communications. International Journal of Network Management, vol. 9 Issue 4, pp. 213-220, 1999.
M.J. Freedman and R. Morris. Tarzan: a Peer-to-Peer Anonymizing Network Layer. Proceedings of the 9th ACM Conference on Computer and Communications Security, pp. 193-206, 2002.

(Continued)

*Primary Examiner*—Kambiz Zand
*Assistant Examiner*—David Garcia Cervetti
(74) *Attorney, Agent, or Firm*—Amin, Turocy & Calvin, LLP (57) ABSTRACT

A data-sharing scheme between entities disposed behind respective firewalls. A sharer of the data subscribes to a public service that enables a secure connection (similar to a peer-to-peer network) between at least one requestor and the data sharer. By subscribing, the sharer provides information to the service that enables the service to generate a private key. When the request is received from the requestor, the service retrieves the corresponding private key, authenticates the requestor, and transmits the key to the requestor thereby facilitating a secure tunnel for communicating the shared data. The requestor can then access the data directly from the sharer without the need for copying or moving the shared data to a server outside the firewall or for emailing.

32 Claims, 7 Drawing Sheets

U.S. PATENT DOCUMENTS

2003/0009587 A1* 1/2003 Harrow et al. .............. 709/238
2003/0046587 A1* 3/2003 Bheemarasetti et al. .... 713/201
2003/0061287 A1* 3/2003 Yu et al. ..................... 709/205
2003/0131258 A1* 7/2003 Kadri ......................... 713/201
2003/0179230 A1* 9/2003 Seidman .................... 345/750
2003/0221009 A1* 11/2003 Standridge et al. ......... 709/227

OTHER PUBLICATIONS

M. Adadi, A. Birrell, R. Stata, and E. Wobber. Secure Web Tunneling. Proceedings of the 7th International Conference on World Wide Web, pp. 531-539, 1998.

* cited by examiner

FIREWALL TUNNELING AND SECURITY SERVICE

TECHNICAL FIELD

This invention is related to data sharing between computers.

BACKGROUND OF THE INVENTION

With the ever-increasing pervasiveness of system attacks and attempted intrusions, organizations, as well as home computer users, implement software and/or hardware firewalls that block unauthorized access making file and data sharing a more onerous prospect. Traditionally, transferring data and files between computers is accomplished by using email (electronic mail) or placing the files on a server located outside of a local firewall and made accessible to the users. The server can then be accessed by others without exposing internal sources of data. (This also includes peer-to-peer topologies.)

However, there are drawbacks to both cases. Email systems have severe restrictions on transferring files (e.g., size, type of files, and issues with security and privacy). The server solution is not available to a majority of users in a secure way, since subscribers of, for example, a DSL (Digital Subscriber Line) service would be placing the server machine outside of the local gateway/firewall, and to some extent, exposing the shared files. This solution is not feasible in many scenarios, however, due to storage size restrictions, security concerns, costs, etc. Even when considered "secure", the provider cannot totally guarantee data security, since new security holes are discovered periodically in products. For at least this reason, a majority of users are skeptical of placing confidential information and critical files on publicly-accessible servers or networks.

Moreover, in order to share data between computers that are separated by firewalls (and on different networks) the user typically must go through a laborious exercise that requires much more than a basic understanding of interacting with a computer. A technical knowledge is required that is beyond the knowledge of the average user to configure the user's computer to perform data sharing behind firewalls. Even if configured correctly, newly discovered security holes can enable unauthorized access by hackers to secure information. The user must understand the technologies involved, as well as applications suitable for specific data sharing scenarios. Thus, placing a computer on an open network (e.g., the Internet) requires continuous maintenance to ensure that security holes are plugged.

What is needed is an improved file sharing architecture.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises architecture that facilitates data sharing between at least two computers disposed behind separate firewalls. A sharer of the data subscribes to a public service that enables a secure connection (similar to a peer-to-peer network) between at least one requestor and the data sharer. By subscribing, the sharer provides information to the service that enables the service to generate a private key. When the request is received from the requestor, the service retrieves the corresponding private key, authenticates the requestor, and transmits the key to the requestor thereby facilitating a secure tunnel for communicating the shared data. The requestor can then access the data directly from the sharer without the need for copying or moving the shared data to a server outside the firewall or for emailing. Files intended to be shared are marked on the sharer local computer giving access rights to authorized requestors (or persons) who may reside on a different secure network. The private key is transmitted to authenticated requestors who use client software suitable for accessing the shared resources. The private key can also be transmitted for embedding within the sharer and requestor web browsers to facilitate access to the shared resources.

In another aspect thereof, the service resides with the sharer such that the requestor transmits the request to the sharer service for authentication and secure tunneling directly with the requestor.

In yet another aspect of the present invention, the service location is a service system that includes a plurality of services on a single subsystem, and a plurality of the subsystems communicating according to a peer-to-peer relationship.

In still another aspect thereof, a classifier is employed to perform automated functions of the present invention.

In another aspect of the present invention, the service operates according to an on-demand relationship and a polling scheme.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
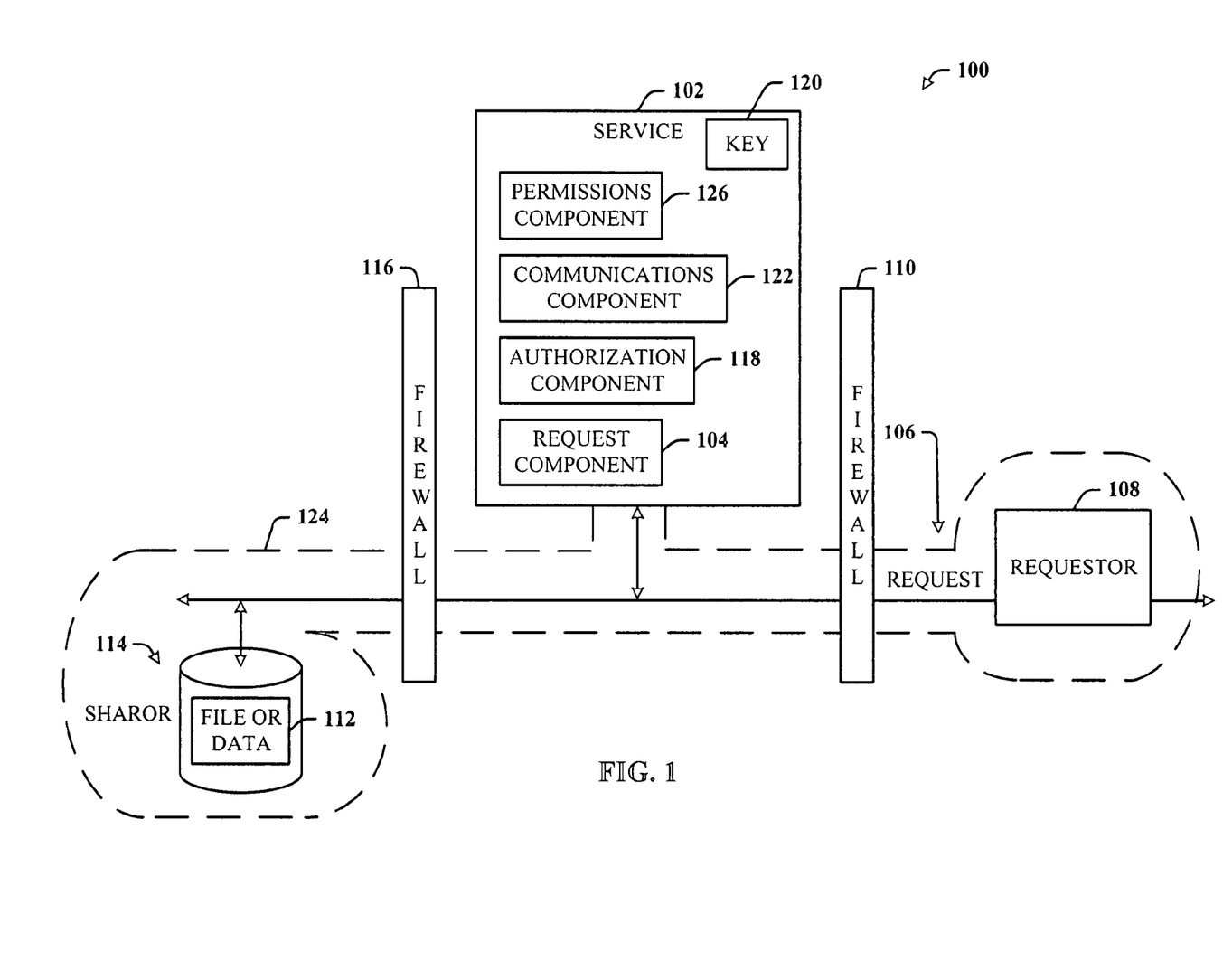
FIG. 1 illustrates a block diagram of a data sharing system in accordance with the present invention.

Referring now to FIG. 1, there is illustrated a block diagram of a data sharing system 100 in accordance with the present invention. The system 100 facilitates a mechanism for sharing data (also in the form of files and any other types of data structures) between computing systems disposed behind separate firewalls. A public service (a proxy service or server) 102 is provided that enables the sharing without the requirement of copying the files intended for sharing to this server or another server disposed outside the firewalls. The system 100 includes a request component 104 that receives a request 106 from a requestor 108, disposed behind a first firewall 110, to access a file 112 intended for sharing by a sharer 114 disposed behind a second firewall 116. The sharer 114 subscribes to the service 102, which subscription process includes a registration process comprising the generation of a unique key 120 by the service 102 that is associated with at least the sharer, the sharer location, and the data to be shared. The service 102 stores the key 120 locally. The request 106 includes share data that indicates the intended sharer 114, although neither the sharer 114 nor the requestor 108 knows of the absolute location of each other. Such a relationship is provided by the service 102.

An authorization component 118 verifies if the request 106 is associated with the private key 120 and permits access to the file 112. If so, a communications component 122 establishes a secure tunnel 124 to the requestor 108 of the request 106. The communications component 122 only permits access to the particular data 112, and the data 112 passing through the tunnel 124 is encrypted. The system 100 further includes a permissions component 126 that determines levels of access permitted or assigned to entities outside the firewall 116. The communications component 122 only permits access to the particular data 112. There can be a total access level, and a plurality of limited access levels, e.g., read-only, and modification (overwriting access). Moreover, the communications component 122 only permits uni-directional flow of the data 112 after the request 106 is passed through to the sharer 114. This prevents the spread of computer viruses and other unfiltered attacks.

In the aforementioned implementation, the tunnel 124 is created and sharing is commenced at the demand of the requestor 108. That is, after the sharer 114 comes "on-line" (i.e., registers with the service 102 that sharing of a given data 112 is intended), the service 102 generates the key 120 and, both the service 102 and the sharer 114 simply wait until the requestor 108 "calls" by sending the request to the service 102. This "on-demand" methodology is more efficient than a "polling" scheme, in that neither the sharer 114 nor the requestor 108 needs to operate by polling the service 102 to make the sharing connection. Of course, given that the requestor 108 does not know when the sharer 114 is available for sharing, the requestor 108 can be sending the request 106 to the service 102 before the sharer 114 has come on-line, in which case, the request 106 is simply discarded by the service 102. Note that other tunneling and sharing sessions can be occurring concurrently with this particular sharing session.

Alternatively, the service 102 can store the received request 106 until it is "aged out", which aging process may be associated with expiration of an extended timeout period (e.g., seconds or minutes). Until the request 106 has been aged out, the service 102 can then send status messages (e.g., a message related to waiting) to the requestor 108 to standby until the sharer 114 comes on-line. Once the sharer 114 comes on-line, the service 102 then automatically processes the request and establishes the secure tunnel 124 to facilitate the sharing operation. As before, other tunneling and sharing sessions can be occurring concurrently with this particular sharing session.

In an alternative polling implementation, the sharer 114 registers with the service 102 that sharing of the data 112 is intended. The service 102 generates and stores the key 120. The requestor 108, not knowing when the sharer 114 will come on-line, sends the request 106 to the service 102, which request 106 is assigned a timeout. The requestor 108 then polls the service 102 in an attempt to gain the connection to the sharer 114 before the timeout expires. Similarly, the sharer 114 also polls the service 102 in an attempt to have the connection established before the timeout expires. If, during this timeout period, both polling signals of the sharer 114 and the requestor 108 have arrived, the service 102 then creates the tunnel 124, and the sharing session begins. If, however, no more than one polling request was received (from either the sharer 114 or the requestor 108) within the timeout period, the timeout will expire, and either the request 106 is discarded or after a short time, a new timeout period begins.

In any case, in preparation for connecting to the service 102, the sharer 114 opens a TCP (Transmission Control Protocol) connection to the service 102 via a local HTTP (HyperText Transfer Protocol) or HTTPS (HyperText Transfer Protocol Secure) proxy, which can be part of a web browser, for example. The sharer 114 then issues a GET or a PUT command to the service 102 to check if a request directed to it is awaiting at the service 102 for processing. Similarly, the requestor 108 can use the same protocols for accessing the sharer 114 during the sharing session.

"Access" to a shared resource may also be granted by knowing a globally unique identifier (GUID) of a shared space (instead of username) such as a generated GUID or a name in a URI (Uniform Resource Identifier) form, as in the following example: "microsoft.conf1234.meeting"), and a with matching access key.

Shared spaces can be dynamically created based on information such as physical location, network location, date-time, and virtual location. In one implementation, the service alters (internally) the visible share name (the share name that user selects/enters) to include such information. In an alternate implementation, the service does not alter the share name, but instead, the service creates an additional encrypted selector/access code to properly redirect and access the shared resource. For example, a dynamic shared space may be created in a conference room that generally is known as "Microsoft.conf1234.meeting" (this could be written on the door). This name can be internally altered by the service to "Microsoft.conf1234.meeting.200312061500.00AEBC43.bob" to create a unique and secure shared space. The "200312061500" portion is derived from date-time, "00AEBC43" is derived from physical address of the wireless access point (WAP) address to which laptops in that room are, and "bob" may be an additional share code given to the attendees in the room. Note that computers connected to the network using means other than the physical WAP used in the conference room will not be able to connect to this shared space. Additionally, this shared space will not be accessible during other times or without knowing the additional share key ("bob").

Another example considers Internet access while in vendor coffee shop. The physical network address of the WAP in each vendor coffee shop could be used in the creation of a unique share name, and only people that are physically present in the shop would be able to access that share, creating a location-aware share service (that could also include coupons, specials, events, etc., for this specific location).

Figure 2:
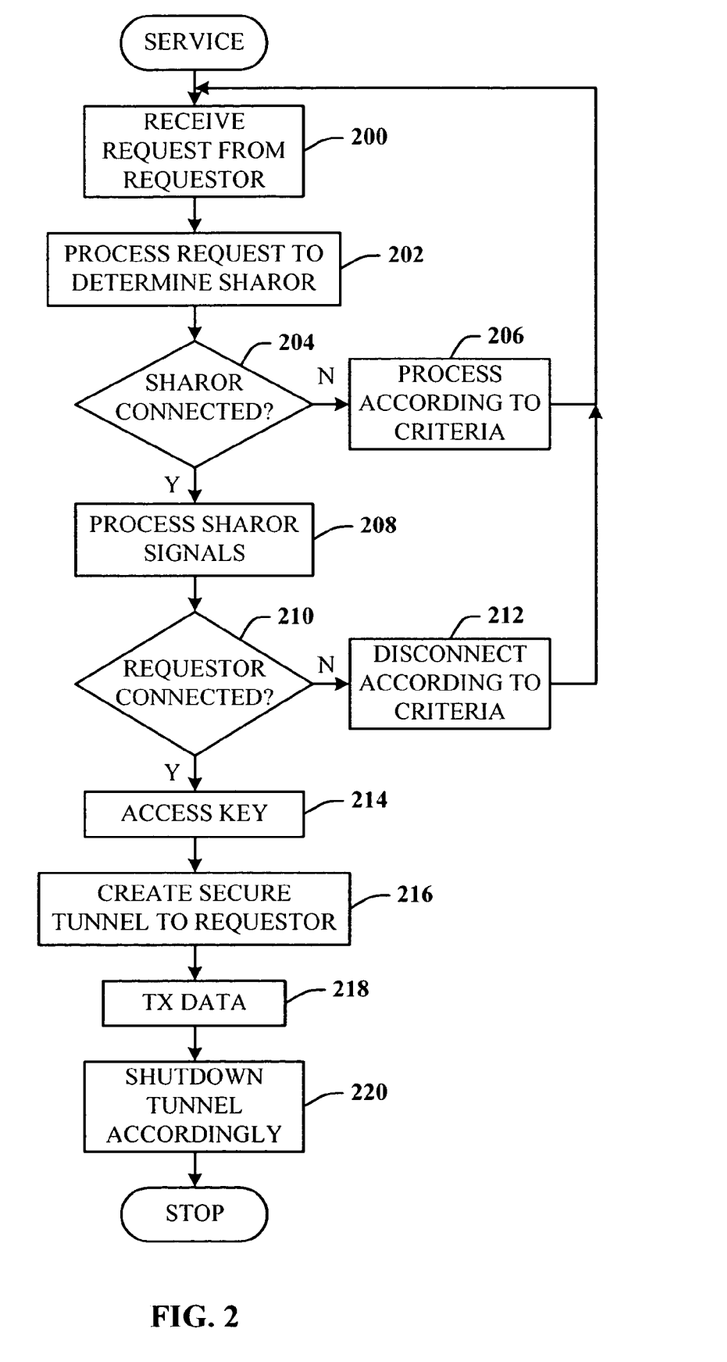
FIG. 2 illustrates a flow chart of a service process in accordance with the present invention.

A physical location (address) may be used to create a personal mail service (a shared space) in which the users would only know the address and name of the recipient. Based on this data (after normalization), a standard share name is created that uniquely addresses each person's "share". Registration to this service could require the specifying of a physical address in order to receive the service key to activate the service (the key being received by regular mail or phone #, or some other data system). Each correspondence would be traceable and non-anonymous in such system. Referring now to FIG. 2, there is illustrated a flow chart of a service process in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, the service receives a request from a requestor. At 202, the service processes the request to determine the sharer. This is because the requestor never knows the network location of the sharer, but includes in the request signal share data that allows the service to sufficiently identify the sharer such that the service can make the connection with the sharer. At 204, the service determines if the sharer is connected. If not, flow is to 206 to process the request according to predetermined criteria, which can be a timeout. That is, the request can be stored temporarily in a queue by the service until it is determined that the sharer will not be on-line or available to permit access to the requested data. Of course, the request can be discarded after the timeout expires, or maintained by the service for some period of time. If maintained, this can require more memory for storing such requests. From 206, flow is then back to the input of 200 to receive another request.

If the service determines that the sharer is connected, flow is from 204 to 208 to process sharer signals, which signals can include handshaking to ensure that the sharer is now ready for data sharing. At 210, the service determines if the requestor is still available, and if not, flow is to 212 to disconnect the requestor according to predetermined criteria. Flow is then back to the input of 200. The predetermined criteria can include the service prompting the requestor for availability. This can also include scheduling the requestor and the sharer for a future connection to share the data during an off-peak time, for example.

If the requestor is connected and ready, flow is from 210 to 214 where the service accesses the sharer key, and passes the sharer key to the requestor. At 216, the service then opens a secure tunnel between the sharer and the requestor. At 218, the requestor accesses the data of the sharer. The service monitors the sharing process, and once completed, the service shuts down the secure tunnel. The process then reaches a Stop block.

Figure 3:
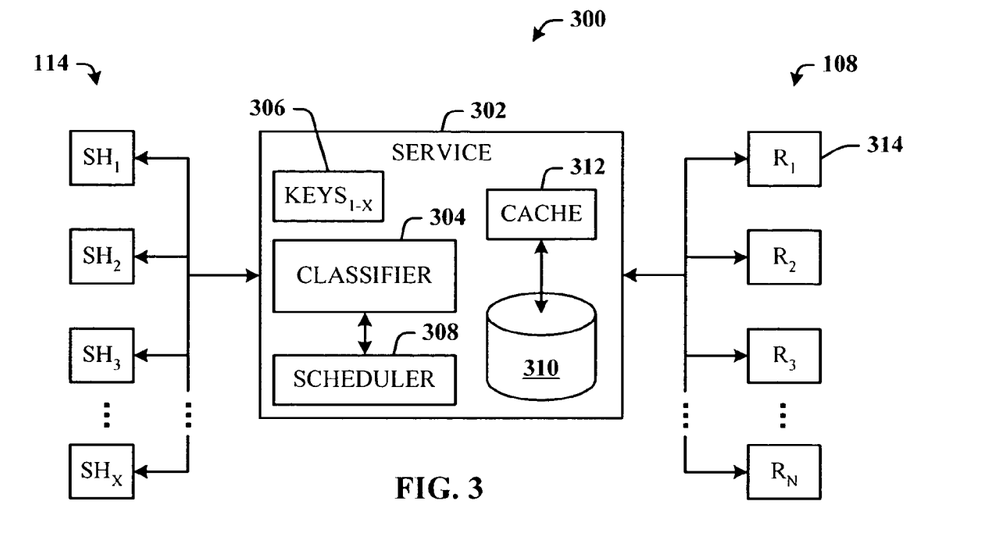
FIG. 3 illustrates a system where a service utilizes a classifier to perform various functions in accordance with the present invention.

Referring now to FIG. 3, there is illustrated a system 300 where a service 302 utilizes a classifier 304 to perform various functions in accordance with the present invention. The service 302 (similar at least to the service 102 of FIG. 1, but now with additional capabilities) performs numerous data-sharing operations between a plurality of requestors 108 (also denoted $R_1, R_2, R_3, \ldots, R_N$) and a plurality of sharers 114 (also denoted $SH_1, SH_2, SH_3, \ldots, SH_x$). Each of the sharers 114 has registered with the service 302 thereby establishing a corresponding number of sharer keys 306 (denoted $KEYS_{1-x}$) stored by the service 302. Note, however, that the keys 306 can also be stored remotely from the service 302 at a key repository (not shown), for example. Thus, the service 302 is sufficiently robust to process numerous requests and data-sharing operations.

The content of the keys 306 includes information that can be used to uniquely identify the sharer, the location of the sharer on the network, and the data to be shared. Additionally, the key content can include other information, such as the permission level given to the requestor by the sharer.

The classifier 304 can operate to facilitate leveling the load that can be placed on the service 302 during peak periods of file-sharing requests and file-sharing operations. For example, where the key includes some indication of the type of data intended to be shared (in the form of the data content), the classifier 304 can be configured to prioritize the sharing operation based thereon. In support thereof, the service 302 also includes a scheduler 308 under control of the classifier 304 that schedules when the data sharing will commence. If the load on the service is manageable, the data sharing process can occur immediately. If the load is degrading performance of the service 302, and the data content of a given requested sharing operation is determined to be of a lower priority, as determined by the generated key, the classifier 304 can reschedule the associated data-sharing operation for a later time. Of course, all rescheduled sharing operations awaiting processing can be further shuffled as new priorities arrive in the scheduling queue. The level of granularity provided by the classifier also allows for the selection of logical system ports to balance loading situations.

The classifier 304 can employ various artificial intelligence based schemes for carrying out various aspects of the subject invention. Separate from or in addition to determining levels of priority for scheduling the data-sharing operation, the classifier can be employed to analyze content of the data intended for sharing and the status of the requestor to automatically determine the level of permission applied to the requestor. For example, where the data is finance data, an the requestor is not within the finance group, the permission automatically assigned to the requestor can be a read-only.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of data-sharing systems, for example, attributes are words or phrases or other data-specific attributes derived from the words (e.g., database tables, the presence of key terms), and the classes are categories or areas of interest (e.g., levels of priorities).

For example, a support vector machine (SVM) classifier can be employed. An SVM operates by finding a hypersurface in the space of possible inputs that separates the triggering criteria from the non-triggering criteria. Intuitively, this makes the classification correct for testing data that is near, but not identical to training data. Other directed and undirected model classification approaches include, e.g., näive Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) may be used to automatically determine according to predetermined criteria when the requestor will be given access to data sharing of the sharer (even if previously authorized to do so), what permission level will be automatically assigned to the requestor, when to process the data-sharing operation, etc. The criteria can include, but is not limited to, the amount of data to be shared, the type of data, the importance of the data, the time of the requested sharing, number of other requested sharings, and the level of confidence requested for ensuring that the requestor should be allowed to receive the data.

The service 302 also includes a storage device 310 for at least storing keys, tracking requests, storing classifier data, and logging data-sharing processes. The storage device 310 is not required to store uploaded user files from the sharer, as in traditional data-sharing operations, since the requestor is allowed access directly or the sharer machine, and data location. This facilitates more efficient use of service resources and precludes the need for large storage capabilities of the service machine. In support of high-speed operations, the service 302 also includes a cache memory 312 that caches data in accordance with traditional caching operations.

The classifier 304 can also utilize the cache 312 by moving data into and out of the cache 312 as the scheduling and priority parameters indicate. Where the classifier learns that a given requestor requests data-sharing at a now regular interval, the classifier can cache key information and other related data in the cache 312 in anticipation of the next data-sharing operation of that requestor.

It is to be appreciated that the service 302 can accommodate data-sharing operations of a single requestor 314 across more than one sharer 114. For example, consider that at a given time each day, at least two of the sharers 114 (e.g., $SH_1$ and $SH_2$) each submit a key to the service 302 with the expectation that the requestor 314 will connect up and harvest the designated data from each of the sharers 114. Once the service 302 receives the request(s) for the requestor, which can be a single request that embodies the share data for the two different sharers ($SH_1$ and $SH_2$), or can be two separate requests processed in the normal fashion. Thus, there is established two secure tunnels from the single requestor to the associated sharers ($SH_1$ and $SH_2$).

In a similar manner, there can be two requestors (e.g., $R_2$ and $R_3$) seeking data sharing with a single sharer (e.g., $SH_1$). The service 302 holds the key of the sharer ($SH_1$), the key indicating which data is to be shared. When each of the requestors ($R_2$ and $R_3$) submits the request to the service 302, the service 302 validates the requests and opens secure tunnels from both of the requestors ($R_2$ and $R_3$) to the sharer to facilitate data sharing. The tunnels are then closed when each requestor ($R_2$ and $R_3$) has completed the sharing process.

It is to be appreciated that the service 302 can disconnect itself from the tunneling channel. This can occur by the service first processing the received request, and then sending the corresponding key to the requestor via e-mail. The requestor then uses the key to establish the tunnel directly with the sharer, bypassing the service 302 altogether.

Figure 4:
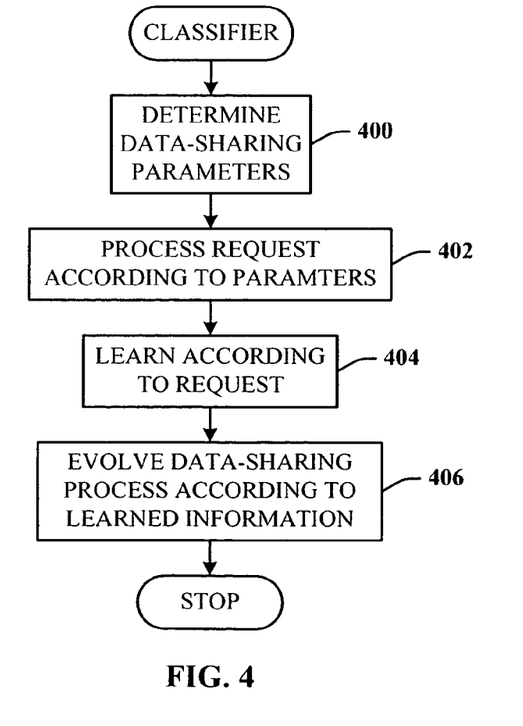
FIG. 4 illustrates a flow chart of a methodology of employing the classifier in accordance with the present invention.

Referring now to FIG. 4, there is illustrated a flow chart of a methodology of employing the classifier in accordance with the present invention. At 400, the service uses the classifier to determine the most recent data-sharing parameters. This includes retrieving from storage the most recent updated processing criteria. At 402, the service receives the request and uses the classifier to process the request according to the data-sharing parameters. This includes examining the key data included in the associated key, and making determinations based on the available key data. Where the available key data is insufficient, the service can communicate with the sharer to request further information in order to make the necessary determinations, since there already exists a secure link established between the service and the sharer. At 404, the classifier learns according to the given data-sharing process. At 406, the classifier folds this learned data into the existing classifier criteria for use with future data-sharing processes by the requestor and/or other requestors. The process then reaches a Stop block.

Figure 5:
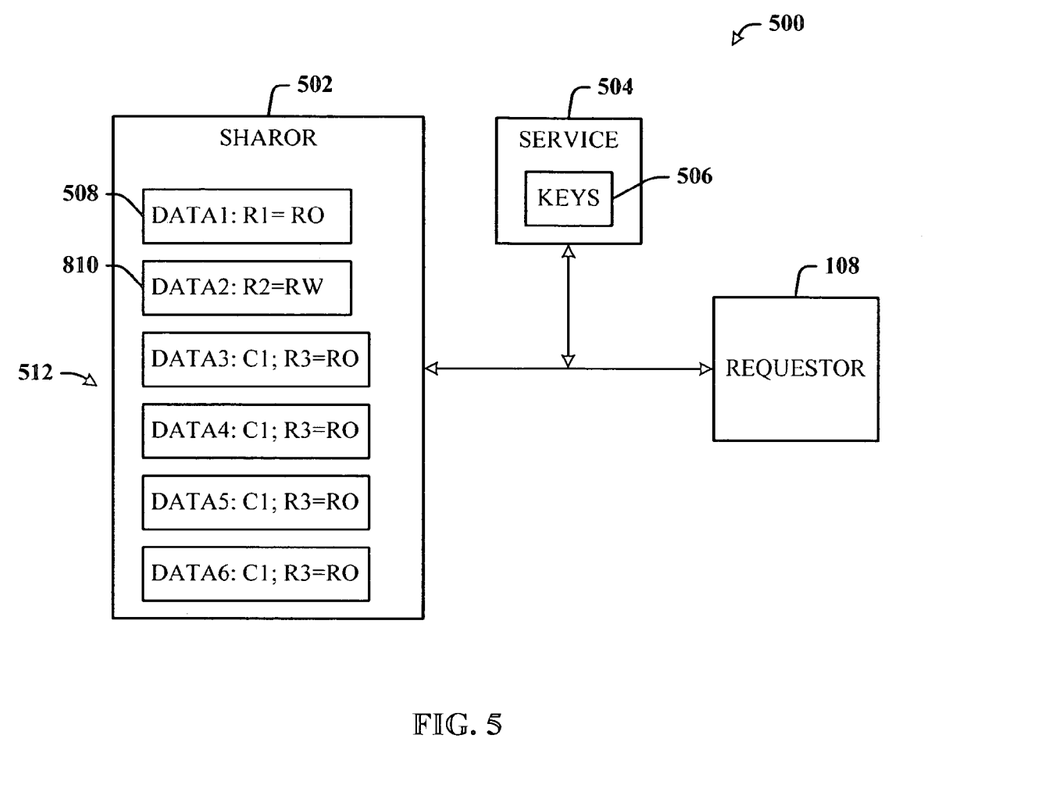
FIG. 5 illustrates a system that shows a capability of the present invention for a requestor to obtain data in accordance with differing levels of permissions and a data class.

Referring now to FIG. 5, there is a system 500 that illustrates a capability of the present invention for a requestor to obtain data in accordance with differing levels of permissions and a data class. These deferring levels can be facilitated in the user computer operating system or other supporting application by allowing the user to select the data, and then right-click to edit the properties associated therewith such that the data includes attributes associated with a class of data, a certain request, and modification permissions, for example. A sharer 502 (similar to sharers 114) registers with a service 504. In response, the service 504 generates one or more keys 506 associated with each or a plurality of the data (508, 510, and 512) intended for sharing. When the requestor 108 sends a request to the service 504, the service 504 extracts the share data therefrom to retrieve the appropriate keys 506. If there is only one key required to return the requested data, the service 504 extends a secure tunnel to the requestor 108 (the tunnel already in existence between the sharer 502 and the service 504 due to any one of the keys generated by the service 504). If there is more than one request submitted to the service 504, a separate tunnel for each request can be opened from the sharer 502 to the requestor in a consecutive or concurrent manner. Alternatively, the service 504 is sufficiently sophisticated to process bundles of requests from a single requestor to a single sharer, and maintain a single tunnel for the multiple requests to the same sharer 502.

In FIG. 5, the sharer 502 includes data identified with a particular requestor (R1), and with each data having a different level of permission. For example, a first request (R1) can seek to retrieve a copy of a first data 508 (also denoted DATA1) that has a read-only (RO) permission level. A second request (R2) from the requestor 108 can seek to retrieve a copy of a second data 510 (also denoted DATA2) that has a read-write (RW) permission level. A third request (R3) from the requestor 108 can be associated with a class of data 512 (also denoted DATA3, DATA4, DATA5, and DATA6) such that the single request allows retrieval of the data class 512. As indicated here, the total class 512 has a RO permission level. However, the permissions can be mixed among the files, such that the only the weakest level dictates the permissions for all. This is because it is not beneficial to the sharer to have permissions overridden in that all files that were read-only could then be retrieved in read-write status. Thus, if three of the data 512 were read-only status, and one was read-write status, all four data 512 would be retrieved in read-only status. Of course, the system 500 can be configured to all the retrieval of a class of data having mixed permissions.

It is to be appreciated that the service can be configured to "establish-and-forget" the tunnel and sharing operation, instead of monitoring when the sharing operation is complete, and then closing the encrypted tunnel. This can be accomplished by the service 502 facilitating the tunneling aspect and then transmitting a monitor file to the sharer 502 or the requestor 108 to facilitate encryption, and monitor the sharing operation in terms of the status of the file being copied or manipulated. When the monitor file senses that the file size has been reached, it automatically closes the tunnel, and flags itself for deletion. This way, the resources of the service 504 do not need to be expended overseeing the various sharing operations being performed.

Figure 6:
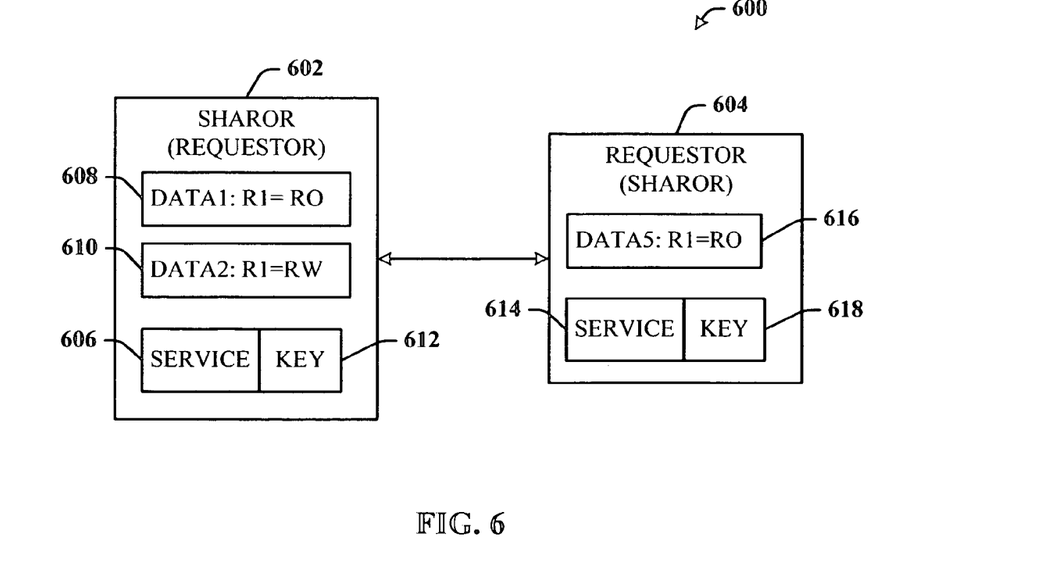
FIG. 6 illustrates a head-to-head system configuration showing a service as embodied in a client.

Referring now to FIG. 6, there is illustrated a head-to-head system configuration 600 showing a service as embodied in a client. Here, both clients (602 and 604) interact, with one being the requestor client 604 (similar to requestor 108) while the other is the sharer client 602. In this implementation, the request message also includes the location of the sharer 602. Additionally, during installation or at a later time, the user of the sharer system 602 can launch the service 606 and stipulate (as before) what data (608 and/or 610) is intended for sharing. The service 606 then generates a key 612 for use with that particular data sharing operation. Thus, when the requestor 604 initiates a request message, the request data of the message includes the network address of the sharer 602. However, when received at the sharer 602, the request is interrogated (along with any other incoming data packets) and routed to the local service 606. The service 606 analyzes the request message, extracts the sharing data, retrieves the key 612, and facilitates the sharing operation by extending a secure tunnel from the sharer 602 to the requestor 604. The requestor 604 then retrieves both/either of data (608 and/or 610) in accordance with the allowed sharing operation. The tunnel is then closed down after completion of the sharing operation. Note that the local service 606 can be implemented on a local, but separate computer (not shown) in a peer-to-peer fashion, which peer computer communicates with the local client 602 to facilitate the service in accordance with the present invention.

Similarly, the requestor 604 can include a service 614, the configuration of which or later use of which allows the requestor 604, now the new sharer 604, to configure one or more data 616 for sharing. The service 614 generates a key 618 for use with that particular data sharing operation. When the new sharer 604 receives a new request from the sharer 602, now the new requestor 602, the new request is routed to the local service 614. The service 614 analyzes the request message, extracts the sharing data, retrieves the key 618, and facilitates the sharing operation by extending a secure tunnel from the new sharer 604 to the new requestor 602. The new requestor 602 then retrieves the data 616 in accordance with the allowed sharing operation. The tunnel is then closed down after completion of the sharing operation.

It is to be appreciated that data sharing (e.g., uni-directional) of at least two different sets of data (one set located on the sharer 602 for sharing with the requestor 604, and one set on the now sharer 604 for sharing with the now requestor 602) can be occurring substantially simultaneously in opposite directions between the entities (602 and 604).

Figure 7:
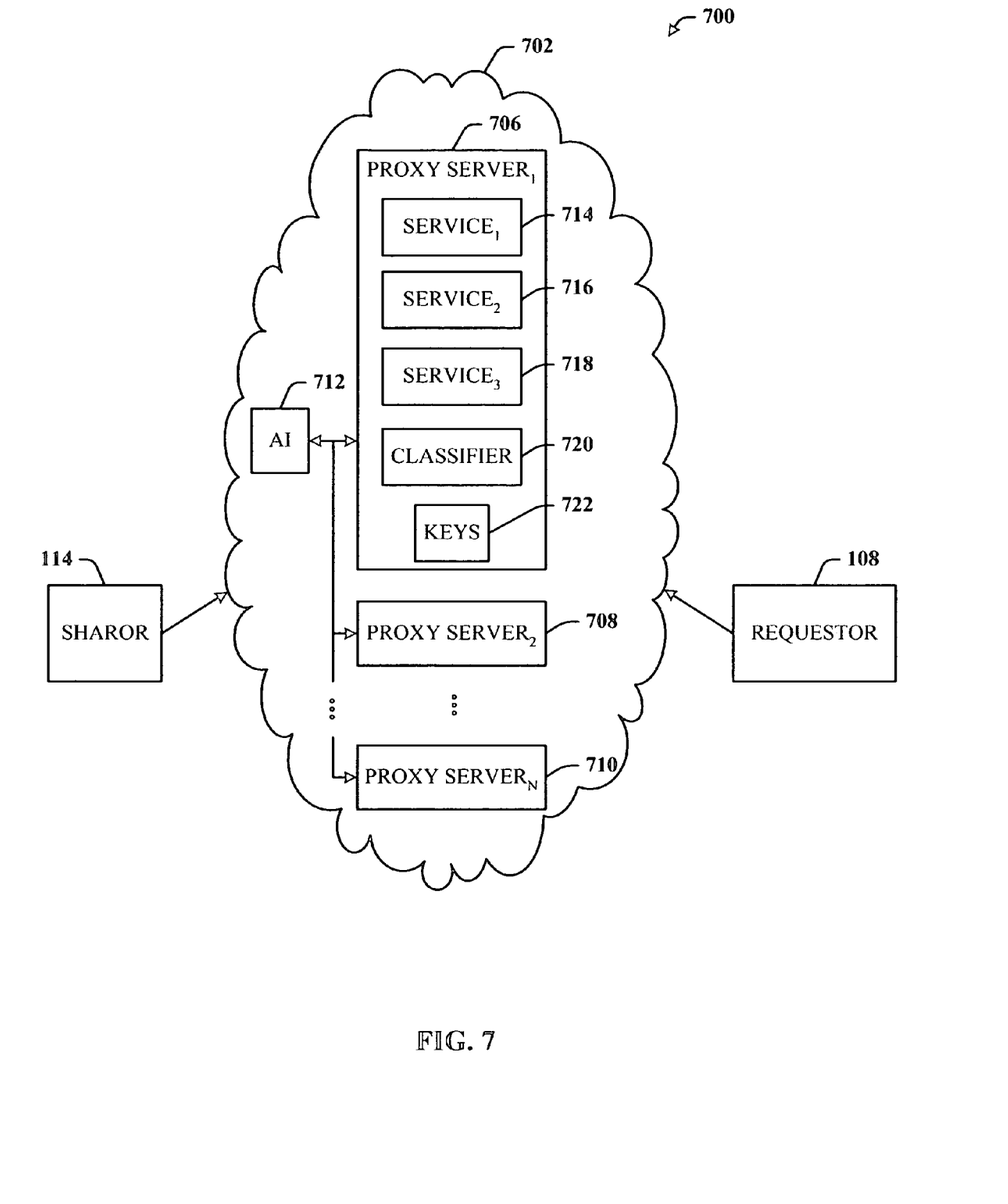
FIG. 7 illustrates a diagram of a network that utilizes a plurality of centralized tunneling services in accordance with the present invention.

Referring now to FIG. 7, there is illustrated a diagram of a network system 700 that utilizes a plurality of centralized tunneling services in accordance with the present invention. There is provided the requestor 108 and the sharer 114 in communication with a global communication network 702 such as the Internet. There are many computing nodes (not shown) disposed in wired and/or wireless communication on the network 702 to send and receive services and data.

In accordance with one aspect of the present invention, there is a centralized proxy service system 704 disposed on the network 702 to facilitate data sharing between a large number of requesting and sharing entities (not shown), as is typical to providing such services between nodes on the Internet, for example. Here, the proxy system 704 includes a number of proxy servers: a first proxy server 706 (also denoted PROXY SERVER$_1$); a second proxy server 708 (also denoted PROXY SERVER$_2$); and, an Nth proxy server 710 (also denoted PROXY SERVER$_N$). Two or more of the servers 706, 708, and 710 can be connected in a peer-to-peer fashion for improved efficiency.

The proxy system 704 also includes a system artificial intelligence (AI) classifier 712 that interfaces to each of the proxy servers (706, 708, and 710) to facilitate selectively employing one or more of the proxy servers (706, 708, and 710) according to loading considerations based upon at least the number of requests and sharer registrations.

The first proxy server 706 further includes a plurality of proxy services 714, 716, and 718 (also denoted respectively as SERVICE$_1$, SERVICE$_2$, and SERVICE$_3$). Thus, within the first proxy server 706, a second classifier 720 is employed to selectively utilize one or more of the resident services 714, 716, and 718, based upon loading balancing parameters processed by the classifier 720. Both the system classifier 712 and server classifier 720 operate according the classifier description provided hereinabove. The system classifier 712 interfaces to the first proxy server classifier 720 to facilitate load balancing between the resident services 714, 716, and 718, and the system proxy servers 706, 708, and 710. The first proxy server 706 also includes a key repository 722 that stores keys generated by at least the sharer 114 registering data for sharing. Of course, the remaining proxy servers 708 and 710 can have the same or similar capabilities of the first server 706.

In operation, the sharer 114 registers to the proxy system 704 for data sharing. Based on the existing loading scheme, the AI classifier 712 routes the registration data to one of the proxy servers 706, 708 or 710, here, the first proxy server 706. Furthermore, the server classifier 720 routes the registration information to one or more of the available services 714, 716 and 718. This can be to multiple services to facilitate expediting the tunneling and sharing process from the service that can first complete the process. The other service(s) are then signaled to discard the enqueued sharing request, since it has already been processed and completed.

It is to be appreciated that once the tunnel is constructed, the sharing process can be achieved by the sharer pushing the shared data to the requestor, instead of the requestor pulling the shared data from the sharer.

In another aspect thereof, the requestor creates a mirror of the sharer data. In support of a collaboration feature, the requestor edits the data and sends it back to the sharer. The sharer can allow the local data to be overwritten, or it can create a new version.

In still another aspect of the present invention, the sharer sends a rules file along with the shared data, such that the rule are imposed on the data at the requestor location to ensure that certain criteria are met, e.g., to prevent the file from being forwarded, copied, edited, and stored in a less secure environment. Data forwarding can be prevented by using an expiring encryption scheme, where the encryption expires after a predetermined amount of time. Alternatively, the rules file can enforce a one-time copy rule where the data is allowed to be copied only once, after which further copying is prevented.

The user at the sharer location can stipulate the security level of the data to be shared, after which the sharing of the data requires that the requestor store the data in at least the same level of security.

Alternatively, the client software, with the aid of the classifier, can automatically estimate the level of security of the local sharer environment, and impose that same level on the requestor through the accompanying rule file. Thus, a data that has now been received by requestor, can be opened only with a fully authorized client that has the key. If the client is unauthorized or is an uncertified copy, then the user either is totally prohibited from viewing the data or can be allowed a limited view, e.g., header data or short summary of data, but not all of the data.

In another implementation, the sharer and requestor are not based on a unique location ID, but a user ID. That is, the tunnel is created based upon a sharer user ID and a requestor user ID, in a person-to-person connection. Thus, data sharing is not restricted to a particular machine or device. This facilitates the utilization of any computing devices capable of wired or wireless communication (e.g., a PDA or portable telephone with such capabilities) for data sharing between the persons. The request then includes a personal ID of the requesting person. The shared data can be uploaded to a storage location associated with the personal ID, which storage location can be anywhere on the network, including the current computing device the person is using. The input of the personal ID causes the request to send, either by the computing device client or by a third party service, for example. Authentication of the person would not necessarily be required; however, it could also be implemented as an additional security measure.

Figure 8:
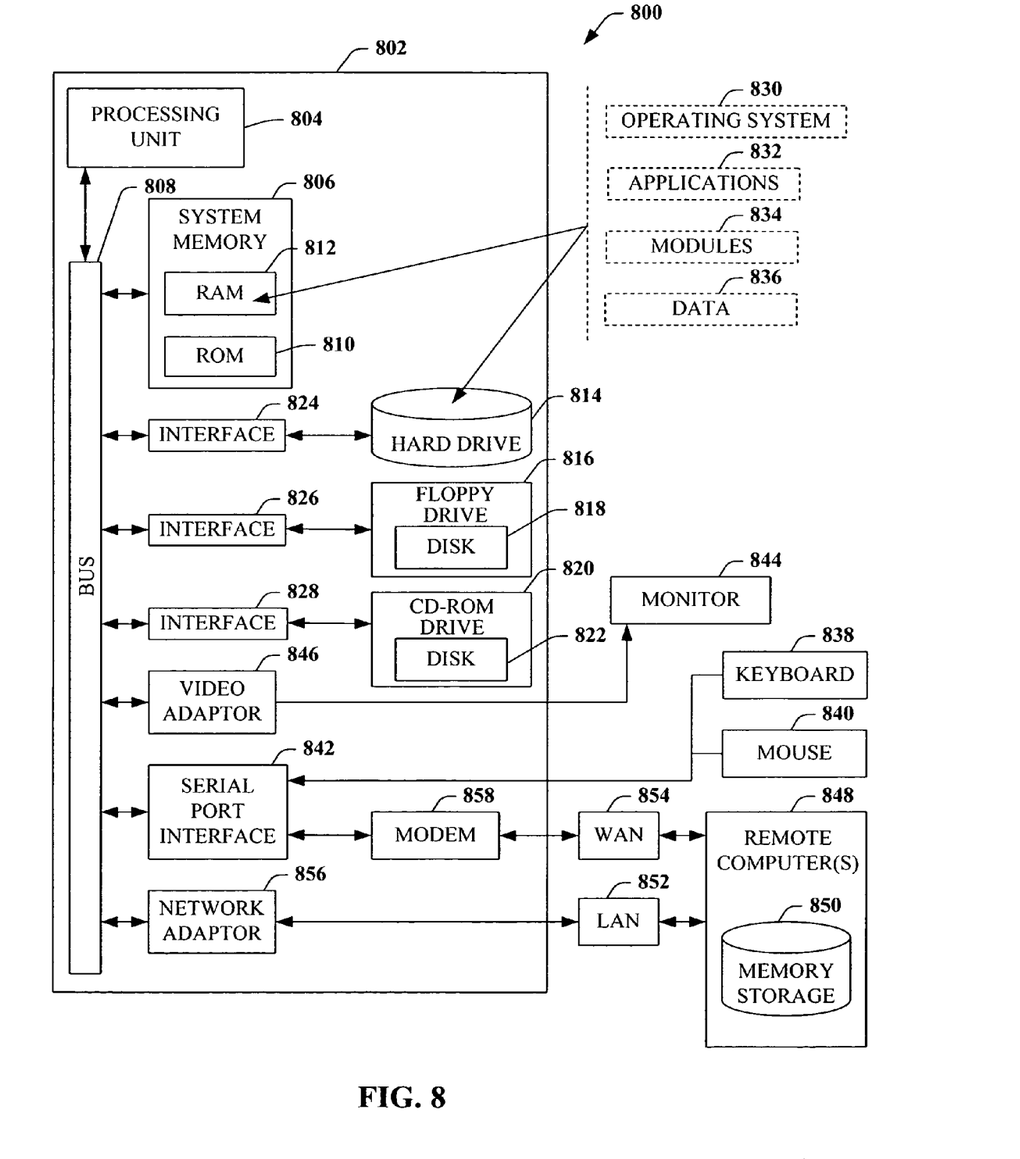
FIG. 8 illustrates a block diagram of a computer operable to execute the disclosed architecture.

Referring now to FIG. 8, there is illustrated a block diagram of a computer operable to execute the disclosed architecture. In order to provide additional context for various aspects of the present invention, FIG. 8 and the following discussion are intended to provide a brief, general description of a suitable computing environment 800 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

With reference again to FIG. 8, there is illustrated an exemplary environment 800 for implementing various aspects of the invention that includes a computer 802, the computer 802 including a processing unit 804, a system memory 806 and a system bus 808. The system bus 808 couples system components including, but not limited to, the system memory 806 to the processing unit 804. The processing unit 804 may be any of various commercially available processors. Dual microprocessors and other multiprocessor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes a hard disk drive 814, a magnetic disk drive 816, (e.g., to read from or write to a removable disk 818) and an optical disk drive 820, (e.g., reading a CD-ROM disk 822 or to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The drives and their associated computer-readable media provide nonvolatile storage of data, data structures, computer-executable instructions, and so forth. For the computer 802, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 812, including an operating system 830, one or more application programs 832, other program modules 834 and program data 836. All or portions of the operating system, applications, modules, and/or data can also be cached in the RAM 812.

It is appreciated that the present invention can be implemented with various commercially available operating systems or combinations of operating systems.

A user can enter commands and information into the computer 802 through a keyboard 838 and a pointing device, such as a mouse 840. Other input devices (not shown) may include a microphone, an IR remote control, a joystick, a game pad, a satellite dish, a scanner, or the like. These and other input devices are often connected to the processing unit 804 through a serial port interface 842 that is coupled to the system bus 808, but may be connected by other interfaces, such as a parallel port, an IEEE 1394 serial port, a game port, a universal serial bus ("USB"), an IR interface, etc. A monitor 844 or other type of display device is also connected to the system bus 808 via an interface, such as a video adapter 846. In addition to the monitor 844, a computer typically includes other peripheral output devices (not shown), such as speakers, printers etc.

The computer 802 may operate in a networked environment using logical connections via wired and/or wireless communications to one or more remote computers, such as a remote computer(s) 848. The remote computer(s) 848 may be a workstation, a server computer, a router, a personal computer, portable computer, microprocessor-based entertainment appliance, a peer device or other common network node, and typically includes many or all of the elements described relative to the computer 802, although, for purposes of brevity, only a memory storage device 850 is illustrated. The logical connections depicted include a local area network (LAN) 852 and a wide area network (WAN) 854. Such networking environments are commonplace in offices, enterprise-wide computer networks, intranets and the Internet.

When used in a LAN networking environment, the computer 802 is connected to the local network 852 through a wired or wireless communication network interface or adapter 856. The adaptor 856 may facilitate wired or wireless communication to the LAN 852, which may also include a wireless access point disposed thereon for communicating with the wireless adaptor 856. When used in a WAN networking environment, the computer 802 typically includes a modem 858, or is connected to a communications server on the LAN, or has other means for establishing communications over the WAN 854, such as the Internet. The modem 858, which may be internal or external and a wired or wireless device, is connected to the system bus 808 via the serial port interface 842. In a networked environment, program modules depicted relative to the computer 802, or portions thereof, may be stored in the remote memory storage device 850. It will be appreciated that the network connections shown are exemplary and other means of establishing a communications link between the computers may be used.

The computer 802 is operable to communicate with any wireless devices or entities operably disposed in wireless communication, e.g., a printer, scanner, desktop and/or portable computer, portable data assistant, any piece of equipment or location associated with a wirelessly detectable tag (e.g., a kiosk, news stand, restroom), and telephone. This includes at least Wi-Fi and Bluetooth™ wireless technologies. Thus the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 9:
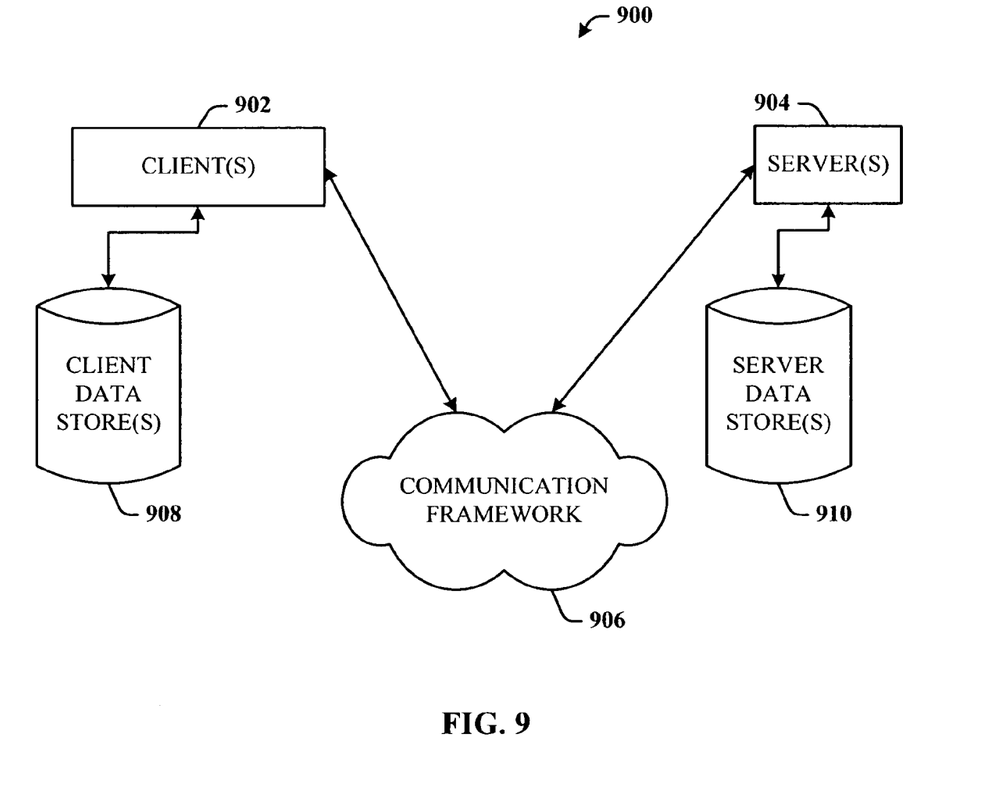
FIG. 9 illustrates a schematic block diagram of an exemplary computing environment in accordance with the present invention.

Referring now to FIG. 9, there is illustrated a schematic block diagram of an exemplary computing environment 900 in accordance with the present invention. The system 900 includes one or more client(s) 902. The client(s) 902 can be hardware and/or software (e.g., threads, processes, computing devices). The client(s) 902 can house cookie(s) and/or associated contextual information by employing the present invention, for example. The system 900 also includes one or more server(s) 904. The server(s) 904 can also be hardware and/or software (e.g., threads, processes, computing devices). The servers 904 can house threads to perform transformations by employing the present invention, for example. One possible communication between a client 902 and a server 904 may be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications may be facilitated via a wired (including optical fiber) and/or wireless technology. The client(s) 902 are operably connected to one or more client data store(s) 908 that can be employed to store information local to the client(s) 902 (e.g., cookie(s) and/or associated contextual information). Similarly, the server(s) 904 are operably connected to one or more server data store(s) 910 that can be employed to store information local to the servers 904.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates data sharing, comprising:
   a request component that receives a request to access data stored behind a firewall;
   an authorization component that verifies if the request is associated with a key that permits access to the data;
   a permissions component that determines one or more levels of access permitted to entities outside the firewall including a complete access level and a plurality of limited access levels; and
   a classifier that automatically performs load balancing of the data sharing process, learning a level of access of the requestor, determining levels of priority for scheduling the sharing of the data, and analyzing content of the data to determine permission levels.

2. The system of claim 1, further comprising a communications component that establishes a secure tunnel to a requestor of the data.

3. The system of claim 2, the data communicated through the tunnel is encrypted.

4. The system of claim 2, the communications component only permits access to the particular data.

5. The system of claim 2, the communications component only permits uni-directional flow of the data after the request is processed.

6. The system of claim 1 provides for authorizing storage of the data from outside to behind the firewall.

7. The system of claim 1, the request is received from a requestor located behind a requestor firewall, wherein a secure tunnel is created and extended from the data behind the firewall through the requestor firewall to the requestor.

8. A computer system that includes a computer readable medium having stored thereon the components of claim 1.

9. A computer readable medium having stored thereon computer executable instructions for carrying out the system of claim 1.

10. The system of claim 1, the data is shared based upon at least one of a location identification (ID), a personal ID, a globally unique ID, and a uniform resource identifier.

11. A system that facilitates the sharing of data, comprising:
    a request component that receives a request from a requestor to access data stored behind a firewall;
    a communications component that establishes a secure tunnel from the data to the requestor of the data; and
    a classifier that automatically performs load balancing of the data sharing process, learning a level of access of the requestor, determining levels of priority for scheduling the sharing of the data, and analyzing content of the data to determine permission levels.

12. The system of claim 11, further comprising a permissions component that determines one or more levels of access permitted to entities outside the firewall, the one or more levels of access include a complete access level and a plurality of limited access levels.

13. The system of claim 11, the request is used to determine the location of the data.

14. The system of claim 11 is in the form of a service that is at least one of local to the data and remote from the data.

15. The system of claim 11, at least one of a sharer of the data and the requestor opens a Transmission Control Protocol (TCP) connection to the system via HyperText Transfer Protocol (HTTP)-based proxy.

16. The system of claim 11, further comprising an authorization component that uses the request to determine a location of the data.

17. The system of claim 11 determines that both the requestor and a sharer of the data are online and authenticated before establishing the secure tunnel therebetween.

18. The system of claim 17 monitors the sharing of the data, and shuts down the secure tunnel after the data sharing has completed.

19. The system of claim 17, further comprising a cache that facilitates expeditious data transfer and request processing.

20. The system of claim 11, the data includes a class of different data files.

21. A method that facilitates data sharing, comprising:
    receiving a request from a requestor to access data of a sharer stored behind a firewall;
    verifying if the request is associated with a key that permits access to the data;

determining one or more levels of access for the requestor;

establishing a secure tunnel between a sharer of the data and the requestor; and transmitting rules data with the shared data such that the shared data can be manipulated only in conformity with the rules data.

22. The method of claim 21, further comprising monitoring the status of the secure tunnel with a monitor file such that the tunnel is closed based on the monitor file, which file is independent of an overseeing service.

23. The method of claim 21, further comprising creating a mirror of the data at the requestor for at least the purpose of collaboration where the data is edited.

24. The method of claim 23, the sharer receives the edited data and at least one of overwrites the data and creates a new version thereof.

25. A system that facilitates data sharing, comprising:

means for receiving a plurality of requests from at least one requestor to access data of a sharer stored behind a firewall;

means for routing the plurality of requests to one or more available services;

means for verifying if the request is associated with a key that permits access to the data;

means for establishing a secure tunnel between a sharer of the data and the requestor; and means for automatically estimating a level of security of an environment of the sharer in which the data is stored.

26. The system of claim 25, further comprising means for determining which of the one or more available services to route selected requests of the plurality of requests.

27. The system of claim 25, further comprising means for load balancing the plurality of requests between the one or more available services.

28. A computer-readable medium having computer-executable instructions for performing a method of sharing data, the method comprising:

receiving a request from a requestor to access data of a sharer stored behind a firewall;

verifying if the request is associated with a key that permits access to the data;

determining one or more levels of access for the requestor; and establishing a secure tunnel between a sharer of the data and the requestor, wherein the requestor must store the data with at least the same level of security in which the data is stored at the sharer.

29. The method of claim 28, the data is communicated between the sharer and the requestor by at least one of the sharer pushing the data to the requestor and the requestor pulling the data from the sharer.

30. The method of claim 28, further comprising dynamically creating a shared space for the shared data based on information that includes at least one of a physical location, a network location, date and time, and a virtual location.

31. The method of claim 30, further comprising automatically altering a share name of the shared space using the information.

32. The method of claim 30, further comprising automatically creating an additional code that facilitates redirection to and access of the shared data.

* * * * *